United States Patent [19]

Murphey et al.

[11] 4,335,788

[45] Jun. 22, 1982

[54] ACID DISSOLVABLE CEMENTS AND METHODS OF USING THE SAME

[75] Inventors: Joseph R. Murphey; Bill M. Young, both of Duncan, Okla.

[73] Assignee: Halliburton Company, Duncan, Okla.

[21] Appl. No.: 114,856

[22] Filed: Jan. 24, 1980

[51] Int. Cl.³ .................... E21B 43/04; E21B 43/08
[52] U.S. Cl. ........................... 166/278; 106/106; 166/244 C; 166/296
[58] Field of Search ............. 166/296, 287, 281, 205, 166/276, 278, 51, 292, 244 C, 315; 106/105–108

[56] References Cited

U.S. PATENT DOCUMENTS

| | | | |
|---|---|---|---|
| 1,333,510 | 3/1920 | Shaw et al. | 106/105 |
| 2,401,035 | 5/1946 | Akeyson et al. | 166/205 |
| 2,649,160 | 8/1953 | Williams et al. | 166/292 |
| 3,495,997 | 2/1970 | Sherry | 106/106 |
| 3,880,233 | 4/1975 | Muecke et al. | 166/295 X |
| 4,018,282 | 4/1977 | Graham et al. | 166/278 |
| 4,018,283 | 4/1977 | Watkins | 166/296 X |
| 4,202,411 | 5/1980 | Sharp et al. | 166/296 X |

*Primary Examiner*—Stephen J. Novosad
*Attorney, Agent, or Firm*—John H. Tregoning; G. Keith deBrucky

[57] ABSTRACT

Cement compositions which upon curing have high compressive strengths and are rapidly dissolved in acids are provided comprised of water, a metal halide or sulfate selected from the group consisting of magnesium, aluminum and zinc halides and sulfates, a metal oxide selected from the group consisting of magnesium, aluminum and zinc oxides and a metal carbonate selected from the group consisting of calcium and barium carbonates. Methods of using the cement compositions are also provided.

67 Claims, No Drawings

ACID DISSOLVABLE CEMENTS AND METHODS OF USING THE SAME

In the drilling, completion and remedial treatment of oil, gas and water wells, it is often desirable or necessary to temporarily seal zones in the wells to prevent excessive fluid loss into the zones, to divert fluids from one zone to another, and to accomplish other purposes. In addition, in such well operations, it is often necessary or desirable to place apparatus having fluid flow passages formed therein in the well bore while temporarily preventing fluids contained in the well bore from entering the fluid flow passages during and/or after placement of the apparatus therein. For example, it is common practice in completing wells in formations containing incompetent sands to place a metal screen or perforated metal liner in the well bore connected to the bottom of the tubing string through which produced fluids from the formation are flowed to the surface. After the liner or screen has been placed in the well bore, it is also common practice to pack the annular area between the liner or screen and the well bore with gravel. The gravel packing and liner or screen prevent incompetent sands and other fines from the formation from flowing with the fluids produced from the formation through production tubing valves and other surface equipment. If such sands and fines are not prevented from flowing with the produced fluids, they can, and often do, plug tubing, valves or other equipment and cause excessive and rapid abrasion of such equipment.

The perforated liners and screens used in wells are normally quite small. Nevertheless, an almost universal problem in the use of such liners and screens is the rapid plugging thereof by incompetent sands, fines, silt and mud during and after placement. While, as mentioned above, the annular space between the liners and well bores are packed with gravel to screen out formation sands, fines, and silt whereby it does not reach the liners or screens, plugging of the liners or screens can and still occurs due to the flow of fluids containing sands, fines and silt through the liners or screens during their placement and before or during placement of the gravel pack. For example, in high pressure wells where fluid weighted with solid weighting materials is used to maintain a hydrostatic head on the producing zones, the weighting materials can substantially plug the liners or screens during their placement due to the flow of the weighted fluid thereacross. Other sources of fines which can plug liners or screens are scale or lime deposits on the well casing, an exceptionally shaley or heaving formation, residual drilling mud particles in the well circulation systems, and crushed fines or silt in the gravel used to form the packing.

Another problem which occurs in the use of liners or screens involves the placing of the gravel packing around the liners or screens. A gravel packing technique which is often used is to suspend the gravel in a carrier liquid which is flowed downwardly along the outside of the liners or screens whereby the gravel is deposited therearound. However, as the carrier fluid flows through the liners or screens during the gravel packing operation, gravel bridges often develop between the outside of the liners or screens and the well bore which prevent complete packing. This results in formation sand flowing to the liners or screens in the unpacked regions plugging the liners or screens and reducing or stopping production of formation fluids.

By the present invention, at least a portion of the perforations in a liner or screen are temporarily sealed with an acid dissolvable cured cement composition whereby fines, silts, etc., are prevented from flowing through the sealed portions during and after the placement thereof and during gravel packing operations. Once the placement and gravel packing operations have been completed, the cured cement composition sealing the liner or screen is contacted with an acid which rapidly dissolves the composition and opens the sealed perforations. Because the acid dissolvable cement composition of this invention has a high compressive strength, it effectively seals a liner or screen against the flow of fluids therethrough even in circumstances where a high pressure differential exists across the sealed liner or screen.

The terms "screen" and "perforated screen" are used hereinafter to refer to a wide range of tubular subsurface devices used in wells including those referred to in the art as "pre-perforated liners," "vertically slotted liners," "horizontally slotted liners," "screens," "prepacked screens," "wire wrapped screens," and the like. The term "gravel" as used hereinafter refers to all granular or aggregate materials used for filtering purposes in wells.

The acid dissolvable cement compositions and methods of this invention can be utilized in a variety of well drilling, completion and remedial treatments as well as in other applications. For example, the cement compositions and methods can be utilized to temporarily seal fluid flow passages in a variety of tools and/or apparatus used in well operations during and after their placement in a well bore as well as for sealing permeable formations, divering treating fluids between formations, etc. Because the viscosity of the cement composition prior to curing can be varied from a relatively thin fluid to a highly viscous fluid, a variety of results can be achieved. The cement compositions and methods can also be utilized advantageously in applications not associated with wells where it is desirable to utilize high strength cement in a zone to accomplish a purpose, but to subsequently rapidly remove the cement from the zone.

The cement compositions of this invention which upon curing have a high compressive strength and are rapidly dissolved in acids are comprised of water, a metal halide or sulfate selected from the group consisting of magnesium, aluminum and zinc halides and sulfates, a metal oxide selected from the group consisting of magnesium, aluminum and zinc oxides and a metal carbonate selected from the group consisting of calcium and barium carbonates.

The mixture of metal halide or sulfate and metal oxide cures with water to form a solid mass which is dissolvable in acids. The addition of the metal carbonate to the mixture increases the compressive strength of the mixture upon curing and brings about the dissolution of the cured mixture in acid at a rapid rate due to the reaction of the metal carbonate with the acid to form carbon dioxide and thereby rapidly expose surface areas of the cured cement to acid dissolution.

If it is desirable to increase the viscosity of the cement composition prior to when the composition cures, a hydratable polysaccharide selected from the group consisting of hydratable galactomannan gums and derivatives thereof, hydratable glucomannan gums and derivatives thereof and cellulose derivatives can be combined with the composition. Increasing the viscosity of the composition prior to curing is particularly advantageous when the composition is used to seal well screens, tools and other apparatus in that the composition is adhesive and sticky and can be troweled onto a screen, etc., prior to curing. In other applications where the cement composition is pumped or otherwise introduced into a well bore or other zone prior to curing, it is often desirable that the composition have a relatively high viscosity so that solid materials such as weighting materials, additives, etc., can be suspended in the composition, to prevent excessive water loss from the composition, etc. Examples of the hydratable polysaccharides described above which are particularly suitable are guar gum, locust bean gum, karaya gum, hydroxypropyl guar gum, carboxymethylhydroxypropylguar gum, carboxymethylcellulose, carboxymethylhydroxyethylcellulose, and hydroxyethylcellulose, all of which are acid dissolvable. Of these, hydroxyethylcellulose is the most preferred.

A preferred low viscosity acid dissolvable cement composition of this invention is comprised of a metal halide or sulfate selected from the group consisting of magnesium, aluminum and zinc halides and sulfates, present in the composition in an amount in the range of from about 15% to about 40% by weight of the composition, a metal oxide selected from the group consisting of magnesium, aluminum and zinc oxides present in the composition in the range of from about 15% to about 60% by weight of the composition, and a metal carbonate selected from the group consisting of calcium and barium carbonates present in the composition in an amount in the range of from about 10% to about 60% by weight of the composition with water, including water of hydration of any of the salts, making up the remainder. Such composition has a viscosity approximately equivalent to that of milk, has a working time of about one hour and cures into a hard solid mass having a high compressive strength in about 24 hours.

A preferred viscous acid dissolvable cement composition of the present invention is comprised of a metal halide or sulfate selected from the group consisting of magnesium, aluminum and zinc halides and sulfates present in the composition in an amount in the range of from about 15% to about 40% by weight of the composition, a metal oxide selected from the group consisting of magnesium, aluminum and zinc oxides present in the composition in an amount in the range of from about 15% to about 60% by weight of the composition, a metal carbonate selected from the group consisting of calcium and barium carbonates present in the composition in an amount in the range of from about 10% to about 60% by weight of the composition and a hydratable polysaccharide selected from the group consisting of hydratable galactomannan gums and derivatives thereof, hydratable glucomannan gums and derivatives thereof and hydratable cellulose derivatives present in the composition in an amount in the range of from about 0.2% to about 2.0% by weight of the composition with water, including water of hydration of any salts making up the remainder. The foregoing cement composition is a thick slurry prior to curing which can be troweled without slumping, has a working time of about one hour and cures into a solid high compressive strength mass in about 24 hours.

The most preferred low viscosity acid dissolvable cement compositions of this invention are comprised of magnesium chloride present in the composition in an amount of about 22–24% by weight, magnesium oxide present in the composition in an amount of about 21–24% by weight of the composition and calcium carbonate present in the composition in an amount of about 21–24% by weight of the composition, with the remainder being water including the water of hydration of magnesium chloride hexahydrate.

The most preferred high viscosity or thick cement compositions prior to curing of this invention are comprised of magnesium chloride present in the composition in an amount of about 22–24% by weight of the composition, magnesium oxide present in the composition in an amount of about 21–24% by weight of the composition, calcium carbonate present in the composition in an amount of about 21–24% by weight of the composition, and hydroxyethylcellulose present in the composition in an amount of about 0.8–1.7% by weight of the composition, with the remainder being water, including water of hydration of magnesium chloride hexahydrate.

Upon curing into hard solid masses, both of the most preferred compositions described above have high compressive strengths, i.e., compressive strengths of 5000 psi or greater, and dissolve very rapidly in aqueous mineral acid solutions. As stated above, the rapid dissolution of the compositions after curing is principally due to the presence of calcium carbonate therein which liberates carbon dioxide when contacted with an acid and thereby brings about the rapid exposure of surface area of the cement to the acid.

While a variety of acids can be utilized for dissolving the cement compositions of this invention, aqueous solutions of strong mineral acids are preferred in that they bring about the most rapid dissolution of the cured cements. Generally, aqueous acid solutions of 5 N concentrations or greater are preferred, and of the mineral acids which can be utilized, aqueous solutions of hydrochloric acid, sulfuric acid or mixtures of such acids are preferred in that insoluble precipitates are not formed as such aqueous acid solutions dissolve the cured cements. The most preferred acid for dissolving the cured cement compositions of this invention is an aqueous hydrochloric acid solution containing 15% by weight hydrochloric acid.

The calcium or barium carbonates in the compositions of this invention increase the compressive strength of the compositions after curing and, depending upon the particular quantity utilized, cause the compositions to contract or expand upon curing. Generally, when the metal carbonate is present in the cement compositions in an amount in the range of from about 10% to about 30% by weight of the compositions, the compositions contract upon curing. When the metal carbonate is present in the compositions in amounts above about 40% by weight of the compositions, the compositions expand upon curing with the greatest expansion taking place at the highest concentration. Thus, by controlling the amount of metal carbonate included in a cement composition of this invention, desired degrees of contraction or expansion of the composition upon curing can be obtained.

In preparing an acid dissolvable cement composition of the present invention, the order of mixing the various components of the composition is not critical. In a preferred technique, the metal halide or sulfate, metal oxide and metal carbonate are first mixed with the water used followed by the hydratable polysaccharide, if used, which upon hydration, increases the viscosity of the mixture. If other components such as weighting materials, fillers, additives, etc., are utilized in the composition, they are preferably combined prior to increasing the viscosity of the mixture by combining the hydratable polysaccharide therewith.

For placing a tool or other apparatus having fluid flow passages formed therein in a well bore and temporarily preventing fluids contained in the well bore from entering the fluid flow passages during and after placement, a cement composition is prepared including a hydratable polysaccharide whereby the resulting slurry is thick, readily adheres to surfaces and fills voids without slumping. The composition is troweled or otherwise placed over the fluid flow passages to be sealed and allowed to cure. Once the cement composition has adequately cured, the tool or apparatus which has been sealed therewith is placed in a well bore using techniques well known to those skilled in the art and during such placement fluids contained in the well bore are prevented from flowing into or through the sealed flow passages. After placement of the tool or apparatus and at a desired time in the particular operation being carried out, an acid is introduced into the well bore whereby it contacts the cured cement composition on the tool or apparatus. Upon such contact, the acid rapidly dissolves the cement composition whereby the sealed flow passages are opened. The acid containing the dissolved cement composition is removed from the well bore in a conventional manner.

In carrying out the methods of the present invention for placing a screen in a well bore and packing the annular area between the well bore and the screen with gravel, all or a portion of the screen is coated with a cement composition of this invention in a manner whereby perforations in the screen are sealed by the cement composition upon curing. The screen is then placed in the well bore at a desired position therein and gravel is packed in the annulus between the screen and the well bore using conventional techniques, generally by flowing the gravel suspended in a carrier fluid downwardly along the outside of the screen whereby the gravel is deposited between the screen and well bore. Once the gravel packing procedure has been completed, an acid is introduced into the well bore whereby the cement composition sealing the screen is contacted with the acid and the cement composition dissolved thereby opening the perforations in the screen.

In the great variety of other applications requiring a temporary block, plug or structure, a cement composition of the present invention is prepared of desired viscosity and introduced into the zone or location of the desired block, plug or structure. Upon curing, the cement composition can be caused to contract or to expand to varying the quantity of metal carbonate contained in the cement composition. Depending upon the particular application, a high viscosity composition prior to curing can be prepared and other suspended materials such as fillers, weighting materials, additives, etc., can be combined therewith to bring about desired results. When the cured cement block, plug or structure is no longer required, it is contacted by an acid whereby the cured cement is rapidly dissolved and removed.

In order to present a clear understanding of the cement compositions and methods of the present invention, the following examples are given.

EXAMPLE 1

Cement compositions containing water, magnesium chloride hexahydrate and magnesium oxide; water, magnesium chloride hexahydrate, magnesium oxide and calcium carbonate; and water, magnesium chloride hexahydrate, magnesium oxide, calcium carbonate and hydroxyethylcellulose are prepared and poured into consolidation tubes one inch in diameter by six inches long. The handling properties of the compositions before curing are noted and the compositions are left overnight at room temperature (70° F.) to cure. Solubility tests are run on samples cut from the consolidations using 15% by weight aqueous hydrochloric acid solutions. The results of these tests are given in Table I below.

TABLE I

SOLUBILITIES OF VARIOUS CURED CEMENT COMPOSITIONS IN AQUEOUS HYDROCHLORIC ACID SOLUTIONS

| Quantities of Components in Cement Composition, Parts by Weight | | | | | Handling Properties | Time Required For Cured Cement Sample To Dissolve In Aqueous HCl Acid Solution,[1] Minutes | Temperature of Acid Solution, °F. |
|---|---|---|---|---|---|---|---|
| $MgCl_2 \cdot 6H_2O$ | MgO | $CaCO_3$ | Hydroxyethyl-cellulose | Water | | | |
| 67 | 40 | — | — | 30 | Low Viscosity | 240 | 72 |
| 67 | 40 | — | — | 30 | Low Viscosity | 210 | 80 |
| 67 | 40 | — | — | 30 | Low Viscosity | 171 | 100 |
| 67 | 40 | 25 | — | 30 | Low Viscosity | 10 | 72 |
| 67 | 40 | 25 | 1 | 30 | Viscous[2] | 10 | 72 |

[1] Aqueous 15% by Weight HCl Solution
[2] Trowelable Onto Screen

From Table I it can be seen that a cement composition of this invention containing calcium carbonate is more readily dissolved, even at lower temperatures, in aqueous hydrochloric acid solutions as compared to compositions without calcium carbonate, and that such a composition including a viscosifier, such as hydroxyethylcellulose, is also rapidly dissolved and is of a viscosity such that it can be troweled onto a screen.

EXAMPLE 2

Cement compositions containing water, magnesium chloride hexahydrate, magnesium oxide and various quantities of calcium carbonate are prepared and cured in accordance with the procedure given in Example 1. The cured consolidations produced are tested for compressive strength in accordance with standard API methods (API RP-10B). The results of these tests are given in Table II below.

TABLE II

COMPRESSIVE STRENGTHS OF CURED CEMENT COMPOSITIONS CONTAINING VARIOUS QUANTITIES OF CALCIUM CARBONATE

| Quantities of Components in Cement Composition, Parts by Weight | | | | | |
|---|---|---|---|---|---|
| $MgCl_2 \cdot 6H_2O$ | MgO | $CaCO_3$ | Hydroxy-ethyl-cellulose | Water | Compressive Strength,[1] psi |
| 67 | 40 | 0 | 0 | 30 | 4710 |
| 67 | 40 | 20 | 0 | 30 | 3215 |
| 67 | 40 | 25 | 0 | 30 | 5125 |
| 67 | 40 | 35 | 0 | 30 | 6076 |

[1] After Curing for 24 Hours

From Table II it can be seen that increasing quantities of calcium carbonate in the cement compositions increases the compressive strengths of the compositions after curing.

EXAMPLE 3

The procedure set forth in Example 2 is repeated and the contraction or expansion of the consolidated cement compositions upon curing is noted. The results of these tests are given in Table III. For the expansion tests each composition is thoroughly mixed and placed in a 2 inch cubic mold open on top. Each mixture is cured 24 hours at ambient room conditions of temperature and pressure before the mold is removed. Each sample is allowed to cure an additional 24 hours under ambient conditions. Then the change in length of each side of each sample is measured and reported as the percent change in volume from the 2 inch cubic mold. This change in volume is shown in Table III as the ratio of the volume of each sample to the basis volume (sample which does not contain $CaCO_3$) and as the percent change in volume ($\Delta\%$ vol.) calculated as:

$$\Delta \% \text{ Vol.} = \frac{\text{Sample Volume} - \text{Basis Volume}}{\text{Basis Volume}} \times 100.$$

TABLE III

EXPANSION OR CONTRACTION UPON CURING OF CEMENT COMPOSITIONS CONTAINING VARIOUS QUANTITIES OF CALCIUM CARBONATE

| Quantities of Components in Cement Composition, Parts by Weight | | | | | Relative Volume | |
|---|---|---|---|---|---|---|
| $MgCl_2 \cdot 6H_2O$ | MgO | $CaCO_3$ | Hydroxy-ethyl-cellu-lose | Water | Ratio | % Vol. |
| 67 | 40 | 0 | 0 | 30 | 1.00 | 0 |
| 67 | 40 | 10 | 0 | 30 | 0.997 | −0.3 |
| 67 | 40 | 20 | 0 | 30 | 0.991 | −0.9 |
| 67 | 40 | 30 | 0 | 30 | 0.983 | −1.7 |
| 67 | 40 | 40 | 0 | 30 | 1.0085 | +0.85 |
| 67 | 40 | 50 | 0 | 30 | 1.0215 | +2.15 |

From Table III it can be seen that magnesium chloride-magnesium oxide cement compositions contract upon curing at calcium carbonate concentrations below about 35 parts by weight of total composition (20% by weight) and expand upon curing above about 40 parts by weight (23% by weight).

Thus, the expansion or shrinkage of the composition of this invention can be varied by varying amounts of components in the compositions. The contraction or negative expansion is unexpected. Variation of the expansion can be used to impart strain, either compression or tension, on the set compositions which can in turn be used to vary the strength, resistance to abrasion, rate of reaction or dissolution and other crystalline properties of the set compositions. Also, it may be used to achieve tighter seals or plugs in conduit systems and the like.

Other advantages of the compositions of this invention are that the compositions have improved fire resistance properties, due to the presence of calcium carbonate therein and when the compositions are formed in molds, they can be caused to contract upon setting and/or they can include the hydratable polymers described above, both of which facilitate the release of the set compositions from the molds.

What is claimed is:

1. A method for controlling the volume change of a cement composition in a desired location comprising the steps of:
   forming a cement composition, which upon curing is rapidly dissolved in acid, said composition consisting essentially of:
   water;
   a metal halide or sulfate consisting essentially of at least one of magnesium, aluminum or zinc halides or sulfates and mixtures thereof;
   a metal oxide consisting essentially of at least one of magnesium, aluminum or zinc oxides or mixtures thereof; and
   a metal carbonate in an effective amount to control volume change of said cement composition consisting essentially of at least one of calcium or barium carbonate or mixtures thereof;
   introducing said cement composition into said location to be cemented; and
   allowing said cement composition to cure into a solid mass in said location.

2. A method of claim 1 wherein said cured cement composition is contacted with an acid whereby said cement composition is dissolved.

3. A method of claim 1 wherein said cement composition is further characterized to include a hydratable polysaccharide selected from the group consisting of hydratable cellulose derivatives, hydratable glactommannan gums and derivatives thereof, hydratable glucommannan gums and derivatives thereof, and mixtures thereof.

4. A method of claim 3 wherein said polysacchardie is present in an amount of about 0.2-2.0% by weight of said composition.

5. A method of claim 1 wherein the metal halide or sulfate is present in an amount of about 15-40% by weight of said composition; the metal oxide is present in an amount of about 15-60% by weight of said composition; and the metal carbonate is present in an amount of about 10-60% by weight of said composition.

6. A method of claim 1 wherein said metal halide or sulfate comprises magnesium chloride present in an amount of about 22-24% by weight of said composition; said metal oxide comprises magnesium oxide present in an amount of about 21-24% by weight of said composition; and said metal carbonate comprises calcium carbonate present in said cement composition in an amount of about 21-24% by weight of said composition.

7. A method of claim 6 wherein said cement composition is further characterized to include a hydratable polysaccharide selected from the group consisting of hydratable cellulose derivatives, hydratable glactommannan gums and derivatives thereof, hydratable glucommannan gums and derivatives thereof, and mixtures thereof.

8. A method of claim 7 wherein said polysaccharide comprises hydroxyethylcellulose present in an amount of about 0.8–1.7% by weight of said composition.

9. A method of claim 8 wherein said cured cement composition is contacted with an acid whereby said cement composition is dissolved.

10. A method of claim 1
wherein said metal halide consists essentially of magnesium chloride present in an amount of about 15–40% by weight of said composition,
said metal oxide consists essentially of magnesium oxide present in an amount of about 15–60% by weight of said composition, and
said metal carbonate consists essentially of calcium carbonate present in an amount of about 10–60% by weight of said composition.

11. A method of claim 10 wherein said cured cement composition is contacted with an acid whereby said cement composition is dissolved.

12. A method of claim 10 wherein said cement composition is further characterized to include a hydratable polysaccharide selected from the group consisting of hydratable cellulose derivatives, hydratable glactommannan gums and derivatives thereof, hydratable glucomannan gums and derivatives thereof, and mixtures thereof.

13. A method of claim 12 wherein said polysaccharide is present in an amount of about 0.2–2.0% by weight of said composition.

14. A method of claim 10 wherein said metal halide or sulfate comprises magnesium chloride present in an amount of about 22–24% by weight of said composition; said metal oxide comprises magnesium oxide present in an amount of about 21–24% weight of said composition; and said metal carbonate comprises calcium carbonate present in said cement composition in an amount of about 21–24% by weight of said composition.

15. A method of claim 14 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

16. A method of claim 15 wherein said polysaccharide comprises hydroxyethylcellulose present in an amount of about 0.8–1.7% by weight and said composition.

17. A method of claim 16 wherein said cured cement composition is contacted with an acid whereby said cement composition is dissolved.

18. A method of placing an apparatus having fluid flow passages formed therein in a well bore and temporarily preventing fluids from entering said fluid flow passages during and after placement comprising the steps of;
sealing said fluid flow passages in said apparatus prior to the placement thereof in said well bore with a cured acid dissolvable cement composition comprising:
water;
a metal halide or sulfate comprising at least one of magnesium, aluminum or zinc halides or sulfates and mixtures thereof;
a metal oxide comprising at least one of magnesium, aluminum or zinc oxides or mixtures thereof; and
a metal carbonate comprising at least one of calcium or barium carbonate or mixtures thereof; and
placing said apparatus in said well bore at a desired location.

19. A method of claim 18 wherein said cured cement composition sealing said fluid flow passages are contacted with an acid whereby said cement composition is dissolved and said fluid flow passages are opened.

20. A method of claim 18 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

21. A method of claim 20 wherein said polysaccharide is present in an amount of about 0.2–2.0% by weight of said composition.

22. A method of claim 18 wherein: the metal halide or sulfate is present in an amount of about 15–40% by weight of said composition; the metal oxide is present in an amount of about 15–60% by weight of said composition; and the metal carbonate is present in an amount of about 10–60% by weight of said composition.

23. A method of claim 18 wherein said metal halide or sulfate comprises magnesium chloride present in an amount of about 22–24% by weight of said composition; said metal oxide comprises magnesium oxide present in an amount of about 21–24% by weight of said composition; and said metal carbonate comprises calcium carbonate present in said cement composition in an amount of about 21–24% by weight of said composition.

24. A method of claim 23 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

25. A method of claim 24 wherein said polysaccharide comprises hydroxyethylcellulose present in an amount of about 0.8–1.7% by weight of said composition.

26. A method of claim 25 wherein said cured cement composition sealing said fluid flow passages are contacted with an acid whereby said cement composition is dissolved and said fluid flow passages are opened.

27. The method of claim 26 wherein said acid is an aqueous acid solution selected from the group consisting of an aqueous hydrochloric acid solution, an aqueous sulfuric acid solution and an aqueous acid solution containing a mixture of sulfuric and hydrochloric acids.

28. A method of placing an apparatus having fluid flow passages formed therein in a well bore and temporarily preventing fluids contained in said well from entering said fluid flow passages during and after placement of said apparatus comprising the steps of:
sealing said fluid flow passages in said apparatus prior to the placement thereof with a cured, acid dissolvable cement composition consisting essentially of:
water;
a metal halide or sulfate consisting essentially of at least one of magnesium, aluninum or zinc halides or sulfates and mixtures thereof present in an amount of about 15-40% by weight of said composition; and a metal oxide consisting essentially of at least one of magnesium, aluminum or zinc oxides or mixtures thereof present in an amount of about 15-60% by weight of said composition; and a metal carbonate consisting essentially of at least one of calcium or barium carbonate or mixtures thereof in an amount of about 10-60% by weight of said composition, whereby the amount of said calcium or barium carbonate or mixtures thereof used controls the change in volume of said cement composition during curing; and placing said apparatus in said well bore at a desired location therein.

29. A method of claim 28 wherein said cured cement composition sealing said fluid flow passages is contacted with an acid whereby said cured cement composition is dissolved and said fluid flow passages are opened.

30. A method of claim 28 wherein said metal halide consists essentially of magnesium chloride present in an amount of about 22-24% by weight of said composition, said metal oxide consists essentially of magnesium oxide present in an amount of about 21-24% by weight of said composition, and said metal carbonate consists essentially of calcium carbonate present in an amount of about 21-24% by weight of said composition.

31. A method of claim 30 wherein said cured cement composition sealing said fluid flow passages is contacted with an acid whereby said cured cement composition is dissolved and said fluid flow passages are opened.

32. In a method of gravel packing a perforated screen placed in a well bore adjacent to a subterranean formation wherein a carrier liquid having gravel suspended therein is flowed along the outside of said screen to deposit said gravel around said screen, the method characterized by:

temporarily sealing at least a portion of the perforations in said screen with an acid dissolvable, cured cement composition prior to placing said screen in said well bore, said composition consisting essentially of;

water;

a metal halide or sulfate selected from the group consisting essentially of magnesium, aluminum and zinc halides, sulfates and mixtures thereof; and a metal oxide selected from the group consisting essentially of magnesium, aluminum and zinc oxides and mixtures thereof;

a metal carbonate selected from the group consisting essentially of calcium and barium carbonates and mixtures thereof, whereby the amount of said calcium or barium carbonate or mixtures thereof used controls the change in volume of said cement composition during curing; and packing gravel around said screen while said screen is sealed with said cement composition.

33. A method of claim 32 wherein said cured cement composition sealing said screen is contacted with an acid whereby said cement composition is dissolved and said screen perforations are opened.

34. A method of claim 32 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

35. A method of claim 34 wherein said polysaccharide is present in an amount of about 0.2-2.0% by weight of said composition.

36. A method of claim 32 wherein the metal halide or sulfate is present in an amount of about 15-40% by weight of said composition; the metal oxide is present in an amount of about 15-60% by weight of said composition; and the metal carbonate is present in an amount of about 10-60% by weight of said composition.

37. A method of claim 32 wherein said metal halide or sulfate comprises magnesium chloride present in an amount of about 22-24% by weight of said composition; said metal oxide comprises magnesium oxide present in an amount of about 21-24% by weight of said composition; and said metal carbonate comprises calcium carbonate present in said cement composition in an amount of about 21-24% by weight of said composition.

38. A method of claim 37 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

39. A method of claim 38 wherein said polysaccharide comprises hydroxyethylcellulose present in an amount of about 0.8-1.7% by weight of said composition.

40. A method of claim 39 wherein said cured cement composition sealing said screen is contacted with an acid whereby said cement composition is dissolved and said perforations are opened.

41. The method of claim 40 wherein said acid is an aqueous acid solution selected from the group consisting of an aqueous hydrochloric acid solution, an aqueous sulfuric acid solution and an aqueous acid solution containing a mixture of sulfuric and hydrochloric acids.

42. The method of claim 32 wherein said metal carbonate is calcium carbonate.

43. A method of claim 42 wherein said cured cement composition sealing said screen is contacted with an acid whereby said cement composition is dissolved and said screen perforations are opened.

44. A method of claim 42 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

45. A method of claim 44 wherein said polysaccharide is present in an amount of about 0.2-2.0% by weight of said composition.

46. A method of claim 42 wherein the metal halide is present in an amount of about 15-40% by weight of said composition; the metal oxide is present in an amount of about 15-60% by weight of said composition; and the metal carbonate is present in an amount of about 10-60% by weight of said composition.

47. A method of claim 42 wherein said metal halide or sulfate comprises magnesium chloride present in an amount of about 22-24% by weight of said composition; said metal oxide comprises magnesium oxide present in an amount of about 21-24% by weight of said composition; and said metal carbonate comprises calcium carbonate present in said cement composition in an amount of about 21-24% by weight of said composition.

48. A method of claim 47 wherein said cement composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

49. A method of claim 48 wherein said polysaccharide comprises hydroxyethylcellulose present in an amount of about 0.8-1.7% by weight of said composition.

50. A method of claim 49 wherein said cured cement composition sealing said screen is contacted with an acid whereby said cement composition is dissolved and said perforations are opened.

51. In a method of forming a fire resistant composition in a mold containing:
water;
a metal halide or sulfate comprising at least one of magnesium, aluminum or zinc halides or sulfates and mixtures thereof; and
a metal oxide comprising at least one of magnesium, aluminum or zinc oxides or mixtures thereof;
the method characterized by varying the expansion or contraction and fire resistance of said composition by controlling in said composition the quantity of a metal carbonate comprising at least one of calcium carbonate, barium carbonate or mixtures thereof; and the method characterized by controlling the viscosity and mold release of said composition by varying in said composition the quantity of a hydratable polysaccharide comprising at least one of a hydratable cellulose derivative, a hydratable glactomannan gum and derivatives thereof; a hydratable glucomannan gum, and mixtures thereof.

52. A method of claim 51 wherein said composition is contacted with an acid whereby said composition is dissolved.

53. A method of claim 51 wherein said composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

54. A method of claim 53 wherein said polysaccharide is present in an amount of about 0.2-2.0% by weight of said composition.

55. A method of claim 51 wherein the metal halide or sulfate is present in an amount of about 15-40% by weight of said composition; the metal oxide is present in an amount of about 15-60% by weight of said composition; and the metal carbonate is present in an amount of about 10-60% by weight of said composition.

56. A method of claim 51 wherein said metal halide or sulfate comprises magnesium chloride present in an amount of about 22-24% by weight of said composition; said metal oxide comprises magnesium oxide present in an amount of about 21-24% by weight of said composition; and said metal carbonate comprises calcium carbonate present in said cement composition in an amount of about 21-24% by weight of said composition.

57. A method of claim 56 wherein said composition is further characterized to include a hydratable polysaccharide selected from the group consisting of hydratable cellulose derivatives, hydratable glactomannan gums and derivatives thereof, hydratable glucomannan gums and derivatives thereof, and mixtures thereof.

58. A method of claim 57 wherein said polysaccharide comprises hydroxyethylcellulose present in an amount of about 0.8-1.7% by weight of said composition.

59. A method of claim 58 wherein said cured composition is contacted with an acid whereby said composition is dissolved.

60. In a method of forming a solid cement mass containing:
water;
a metal halide or sulfate comprising at least one magnesium, aluminum or zinc halides or sulfates and mixtures thereof; and
a metal oxide comprising at least one of magnesium aluminum or zinc oxides or mixtures thereof;
the method characterized by varying the expansion or contaction of said solid cement mass by controlling in said cement mass the quantity of a metal carbonate comprising at least one of calcium carbonate, barium carbonate or mixtures thereof.

61. A method of claim 60 wherein the viscosity before curing of said cement mass is controlled by adding a quantity of hydratable polysaccharide cellulose derivative, a hydratable galactomannan gum and derivatives thereof, a hydratable glucomannan gum, and mixtures thereof.

62. A method of claim 61 wherein said cured cement composition is contacted with an acid whereby said cement composition is dissolved.

63. A method of claim 61 wherein the metal halide or sulfate is present in an amount of about 15-40% by weight of said composition; the metal oxide is present in an amount of about 15-60% by weight of said composition; and the metal carbonate is present in an amount of about 10-60% by weight of said composition.

64. A method of claim 63 wherein said polysaccharide is present in an amount of about 0.2-2.0% by weight of said composition.

65. A method of claim 61 wherein said metal halide or sulfate comprises magnesium chloride present in an amount of about 22-24% by weight of said composition; said metal oxide comprises magnesium oxide present in an amount of about 21-24% by weight of said composition; and said metal carbonate comprises calcium carbonate present in said cement composition in an amount of about 21-24% by weight of said composition.

66. A method of claim 65 wherein said polysaccharide comprises hydroxyethylcellulose present in an amount of about 0.8-1.7% by weight of said composition.

67. A method of claim 66 wherein said cured cement composition is contacted with an acid whereby said cement composition is dissolved.

* * * * *